July 21, 1942.  H. A. DE VRY ET AL  2,290,276

MOTION PICTURE PROJECTOR

Filed June 3, 1940

Patented July 21, 1942

2,290,276

UNITED STATES PATENT OFFICE 2,290,276

MOTION PICTURE PROJECTOR

Herman A. de Vry and Otto R. Nemeth, Chicago, Ill., assignors to De Vry Corporation, Chicago, Ill., a corporation of Illinois Application June 3, 1940, Serial No. 338,520

4 Claims. (Cl. 88—17)

The present invention relates to a motion picture projector provided with a single control knob for adjusting the mechanism of a silent film or sound film motion picture projector to perform its various functions, as, for example, the forward feeding of the film or the reverse and rewinding operation. This single control member thus replaces a plurality of operating knobs or switchboard levers and additional mechanical control devices for separately adjusting the electrical circuits and mechanical features of the mechanism for performing their several functions, as incorporated in previous structures. It will be understood that in the present structure the single control knob or member actuates a multi-way switch for adjusting the electrical circuits of the projector, but such a switch may be of any suitable known form and its specific construction is not a feature of this invention.

The primary object of the invention is to provide control means for a motion picture projector manually adjustable by means of a single knob or operating member and including a multi-way switch, together with cooperating mechanical elements for adjusting the mechanism to perform its several functions, including forward drive, reverse drive, rewinding the film, stopping the film for projection or stopping the film and shutting off the projector light. Other objects and advantages will appear from the following specification taken with the accompanying drawing which illustrate by way of example a single control device for a motion picture projector arranged to perform the five functions just enumerated.

In the drawing:

Figure 1 represents a schematic arrangement of the single knob control device for a motion picture projector embodying this invention.

Figure 2 is a wiring diagram on a smaller scale than Figure 1, indicating the arrangement of the circuit in the off position, that is, with all contacts open for stopping the motor and extinguishing the projection light.

Figure 3 is a wiring diagram showing the circuit adjusted for forward drive.

Figure 4 is a wiring diagram showing the circuit adjusted to arrest the film with the projection lamp lighted for projecting a single frame in still position.

Figure 5 is a wiring diagram showing the circuit adjusted for reverse drive of the film with the projection light turned on.

Figure 6 is a wiring diagram showing the circuit adjusted for reverse drive of the motor to rewind the film with the projection lamp turned off.

Fig. 7 is a diagrammatic face view of the multi-way switch mechanism for controlling the circuits.

In Figure 1 of the drawing, 1 designates the single control knob fixed to a rotatably mounted shaft 2. Keyed to this shaft so as to be turned by the knob 1 is a cam 3 of suitable shape to cooperate with one arm of a lever 4 pivoted at 5, while the other arm of this lever is connected by suitable means, such as a flexible wire 6 shown guided over a pulley 7 and extending to a second lever 8. The lever 8 is pivoted at 9 and arranged to act as a shifter for a clutch 10, one element of this clutch being fastened by means of a pin 10ª to a driving shaft 11, while the other element of the clutch is movable longitudinally on the shaft 11 in opposition to the action of a spring 12 reacting against an abutment shoulder 12ª on the shaft. The spring 12 tends to shift the movable element of the clutch 10 into driving engagement with the other part of the clutch which is fixed to the shaft 11.

Slidable on the shaft 11 with the movable element of the clutch 10 there is shown a gear wheel 13 which meshes with a gear 14 of the projector mechanism when the clutch 10 is shifted into coupled position and which slides out of mesh when the clutch is disengaged. On the shaft 11 there is also secured a one-way driving clutch or ratchet of any suitable construction, not shown in detail, but which may be understood as including spiral gear teeth 15 meshing with a cooperating spiral gear 16 which, in turn, will be employed to drive the film in reverse direction. In other words, the one-way drive of the gear 15 is operative when the shaft 11 rotates in reverse direction but is inoperative to drive the gear 16 when the shaft rotates in its normal forward direction. For forward drive of the film the clutch 10 is engaged and transmits the rotation of the shaft 11 through gears 13 and 14 to the film feeding mechanism of the projector.

The electrical circuit includes main feed wires 17, 17 which supply current for a projector lamp 18 and a reversible motor 19, the shaft of the motor being the driving shaft 11, above mentioned, and shown in association with the clutch 10 in Figure 1. The motor shaft may also be provided with a fan 20.

The knob 1 operates a multi-way switch which, in the present case, is a five-way switch of any suitable construction, indicated more or less diagrammatically in Figure 1. By means of this switch the five contacts 23, 24, 25, 26 and 27 may be opened and closed in accordance with the requirements of the several functions to be performed by the projector mechanism.

The cam 3, being fixed on the same shaft 2 which operates the multi-way switch and its contacts 23, 24, 25, 26 and 27, serves to shift the clutch 10 appropriately to the particular arrangement of the contacts at various positions of the knob 1 and its shaft 2, and thus by a single movement of the knob provides for complete control of the mechanism. Preferably, the knob is provided with an indicator pointer 1ª, and in Figures 2, 3, 4, 5 and 6 the various positions of the knob of the cam 3 are indicated in dotted outline superimposed upon the wiring diagram showing the relation of the contacts 23 to 27 for each adjustment of the shaft 2. These positions of adjustment are as follows:

*Stop or off position (Figure 2).*—As shown, the pointer 1ª is in an oblique position at about 60 degrees in clockwise direction from the position shown in Figure 1, and the cam 3 is turned with its high points disposed along a diameter at right angles to the pointer 1ª. All contacts 23 to 27 are open. Accordingly, the clutch 10 is engaged; the lamp 18 is switched out; the motor 19 is shut down, and the fan 20 is out of action.

*Forward position (Figure 3).*—The knob 1 has been turned further in clockwise direction, pointing obliquely downward, and the high points of cam 3 are aligned along a corresponding oblique diameter. Contacts 26 and 27 are shown open, while contacts 23, 24 and 25 are now closed. Accordingly, the clutch 10 is in coupled relation; the lamp 18 is lighted; the motor 19 is started; hence, the film is illuminated and projected, and the fan 20 is in action.

*Stop on film position (Figure 4).*—The knob is here shown with the pointer 1ª projecting downwardly, and with the high points of the cam on a horizontal diameter. The contacts 26 and 27 are open, and contacts 23, 24 and 25 are closed, all as in Figure 3. Accordingly, the clutch 10 is disengaged with the motor 19 still running; the lamp 18 is lighted. Thus the film is illuminated, but not fed, so that a selected single frame thereof may be steadily projected. The fan 20 remains in action, being operated by the motor.

*Reverse position (Figure 5).*—The pointer of knob 1 extends obliquely downward at about 180 degrees from the position shown in Figure 2, and the cam 3 is accordingly displaced. Contacts 23, 26 and 27 are shown closed, while contacts 24 and 25 are open. As a result, the clutch 10 is in coupled relation, the lamp 18 is lighted, the motor 19 reversed so that the film is fed in reverse direction while illuminated and projected, and the fan 20 is in action.

*Rewind position (Figure 6).*—The knob 1 points vertically upward with the high points of the cam 3 on a horizontal diameter. The contacts 26 and 27 are closed, while contacts 23, 24 and 25 are open. Accordingly, the clutch 10 is disengaged; the lamp 18 is switched out; the motor 19 is reversed and the film is thus rewound through the agency of the one-way drive, including spiral gears 15 and 16; the fan 20 is operative.

By comparison it may be noted that Figure 1 represents the same condition of adjustment of the parts as Figure 6.

Fig. 7 will serve to clarify the construction of the multi-way switch illustrated in Fig. 1. The disk 30 is rotatably adjustable in the control case 22 and is connected to the end of shaft 2 to be turned thereby. The movable spring members of the contacts or switches 23, 24, 25, 26 and 27 are mounted on the inner face of the cover board 21 overlying the disk 30, and they are normally out of contact with the corresponding fixed members. Each of the spring members carries a small bump or node 29, such as a rivet head, projecting from the back of the member and facing the disk 30. The area of the disk is divided into five segments, denoted as *a, b, c, d,* and *e* in Fig. 7. These segments register successively behind the spring contact members as the disk is turned for producing the various circuit conditions indicated in Figs. 2 to 6. Each segment carries forwardly projecting convex nodes or protuberances 31 positioned to engage the bumps or nodes 29 of the spring members when the segment is registered in proper position, thus causing certain of the spring members to engage the fixed contact members and to close the desired circuits. Figs. 2, 3, 4, 5 and 6, respectively, represent the conditions produced by registration of the segments *a, b, c, d,* and *e* with the spring contact members.

It will be understood that the invention is not restricted to the details set forth, since these details may be modified without departing from the spirit and scope of the invention as defined in the appended claims.

Having now particularly described and ascertained the nature of our said invention and the manner in which the same may be performed, we claim:

1. In a motion picture projector, in combination, an electric lamp, an electric motor, a rotary drive shaft operable by said motor, gearing to be driven, a clutch shiftable to connect said gearing with the motor or disconnect it therefrom, electrical conductors providing circuits for the motor and the lamp, a multi-way switch controlling said circuits, and a single rotatably adjustable control member connected to operate said switch and including a cam, together with clutch shifting means operable by said cam upon rotative adjustment thereof by the control member, said cam being formed to determine the position of the clutch for each adjustment of said member in accordance with the corresponding circuit connections for the lamp and motor through said switch.

2. In a motion picture projector, in combination, an electric lamp, an electric motor, a rotary drive shaft operable by said motor, a driving gear on said shaft, a driven gear to mesh therewith, a clutch shiftable to connect said gear with the shaft for forward drive, a second gear on the shaft with a one-way driving connection thereto operable upon reverse rotation of the shaft, gearing to mesh with said second gear for reverse drive, electrical conductors providing circuits for the motor and the lamp, a multi-way switch controlling said circuits and providing connections for operating the motor either in forward or in reverse direction, and a single rotatably adjustable control member connected to operate said switch and including a cam, together with clutch shifting means operable by said cam upon rotative adjustment thereof by the control member, said cam being formed to disengage the clutch when the switch is adjusted for reverse rotation of the motor and to engage the clutch when the switch is adjusted for forward rotation of the motor.

3. In a motion picture projector, in combination with an electric lamp, an electric motor, a rotary drive shaft operable by said motor, gearing to be driven for actuating the film in the projector, a clutch shiftable to connect said gearing with the motor and disconnect it therefrom, electric conductors providing circuits for the motor and the lamp, a multi-way switch controlling said circuits, and a single, rotatable adjustable control member connected to operate said switch and including a cam, together with clutch shifting means operable by said cam upon rotative adjustment thereof by the control member, said switch including contacts arranged to energize the lamp and the motor at one adjustment of the control member at which the cam is formed and positioned to disengage the clutch whereby the projector is adapted to display a single frame of the film in still position.

4. In the combination defined in claim 2, said cam having two portions of its operative contour each formed to cause disengagement of the clutch and said switch being arranged to open the lamp circuit when one of said portions of the cam is operative and to close the lamp circuit when the other of said cam portions is operative.

HERMAN A. DE VRY.
OTTO R. NEMETH.